(12) United States Patent
Gebauer et al.

(10) Patent No.: US 10,915,375 B2
(45) Date of Patent: Feb. 9, 2021

(54) METHOD AND DEVICE FOR THE SYNCHRONIZATION OF PROCESSES ON AT LEAST TWO PROCESSORS

(71) Applicant: Robert Bosch GmbH, Stuttgart (DE)

(72) Inventors: Thomas Gebauer, Allmersbach Im Tal (DE); Christoph Mueller, Ravenstein Merchingen (DE); Cristina Murillo Miranda, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 169 days.

(21) Appl. No.: 15/999,196

(22) Filed: Aug. 16, 2018

(65) Prior Publication Data

US 2019/0056976 A1 Feb. 21, 2019

(30) Foreign Application Priority Data

Aug. 18, 2017 (DE) .................... 10 2017 214 421

(51) Int. Cl.
*G06F 9/52* (2006.01)
*H04L 7/00* (2006.01)
*H04L 25/49* (2006.01)
*G06F 9/30* (2018.01)
*G06F 1/10* (2006.01)
*G06F 1/12* (2006.01)
*H04L 7/02* (2006.01)

(52) U.S. Cl.
CPC ............. *G06F 9/52* (2013.01); *G06F 1/10* (2013.01); *G06F 1/12* (2013.01); *G06F 9/30* (2013.01); *H04L 7/0091* (2013.01); *H04L 25/49* (2013.01); *H04L 7/02* (2013.01)

(58) Field of Classification Search
None
See application file for complete search history.

(56) References Cited

U.S. PATENT DOCUMENTS

| 6,065,131 | A | * | 5/2000 | Andrews | .................... G06F 1/06 712/220 |
| 2017/0003767 | A1 | * | 1/2017 | Holsen | .................. G06F 3/0383 |

* cited by examiner

*Primary Examiner* — Eric C Wai
(74) *Attorney, Agent, or Firm* — Norton Rose Fulbright US LLP; Gerard Messina

(57) ABSTRACT

A method and device for the synchronization of processes, a first signal being sent by a clock-giving processor, the first signal having, in an alternating manner, first edges having a first direction and second edges having a second direction opposite the first edge, a temporal distance between at least one of the first edges and at least one of the second edges being determined as a function of a state of a counter in the clock-giving processor. A method for the synchronization of processes, a first signal being received by a clock-receiving processor, the first signal having, in an alternating manner, first edges having a first direction and second edges having a second direction opposite the first edge, a state of a counter in the clock-receiving processor being determined as a function of a temporal distance between at least one of the first edges and at least one of the second edges.

18 Claims, 2 Drawing Sheets

| k | 123 ... L-1 | | dT |
|---|---|---|---|
| 2 | 11<br>10 | clock<br>sync 1 | $t_2$<br>$t_1$ |
| 3 | 111<br>110<br>100 | clock<br>sync 1<br>sync 2 | $t_3$<br>$t_2$<br>$t_1$ |
| ⋮ | ⋮ | ⋮ | ⋮ |
| L | 111 ... 1<br>110 ... 0<br>⋮<br>100 ... 0 | clock<br>sync 1<br>⋮<br>sync L-1 | $t_L$<br>$t_{L-1}$<br>⋮<br>$t_1$ |

METHOD AND DEVICE FOR THE SYNCHRONIZATION OF PROCESSES ON AT LEAST TWO PROCESSORS

RELATED APPLICATION INFORMATION

The present application claims priority to and the benefit of German patent application no. 10 2017 214 421.1, which was filed in Germany on Aug. 18, 2018, the disclosure which is incorporated herein by reference.

FIELD OF THE INVENTION

The present invention relates to a method and to a device for the synchronization of processes on at least two processors.

BACKGROUND INFORMATION

Conventional systems having a plurality of processors that have to run in temporal synchronization are synchronized via signals that are exchanged via three different signal lines, via general-purpose input-output pins of the processors. Here, a first signal is communicated from a clock pulse-giving processor to a clock pulse-receiving processor. In the first signal, clock edges having alternating direction are transmitted periodically at first time intervals T1. At second time intervals T2=2*T1, the first signal periodically signals, via clock edges having the same direction, starting times at which a first process starts on the clock-giving processor. In the clock-giving processor, a first counter is incremented from 0 to N−1. In the clock-receiving processor, a second counter is incremented from 0 to N−1. The first counter and the second counter count from 0 to N−1 and then start again at 0. For the synchronization of the counters, an edge of a second signal is transmitted from the clock-giving processor to the clock-receiving processor whenever the first counter starts at 0. This takes place periodically, at third time intervals N*T2. In this way, a phase position between the first counter and the second counter can be determined. In the clock-receiving processor, there is situated a state machine that synchronizes the second counter temporally with the first counter, as a function of the phase position. As soon as the second counter is temporally synchronized, a third signal, which confirms the temporal synchronization, is sent from the clock-receiving processor to the clock-giving processor. Only then does the first process actually start. A second process on the clock-receiving processor is then started in a temporally synchronous manner on the basis of the first signal. The third signal is here communicated, at the earliest, after a time duration of 2*N*T2.

It is desirable to enable a synchronization that is improved in comparison with the above.

SUMMARY OF THE INVENTION

This is enabled by the method and the device as described herein.

With regard to the method, for the synchronization of processes it is provided that a first signal is sent by a clock-giving processor, the first signal having, in an alternating manner, first edges having a first direction and second edges having a second direction opposed to the first edge, a temporal distance between at least one of the first edges and at least one of the second edges being determined as a function of a state of a counter in the clock-giving processor.

In this way, the counter state can be coded on the basis of the length of the temporal distance. This makes it possible to transmit the counter state at the clock-giving processor to a clock-receiving processor in the same signal in which possible start times for a process on the clock-receiving processor are transmitted. Compared to conventional signaling, this saves a signal line without making the synchronization slower.

Advantageously, the first signal is sent by the clock-giving processor with periodically repeating first edges, at least the temporal distance between one of the first edges and a second edge immediately following a first edge being determined as a function of the state of the counter in the clock-giving processor. The possible start times are thus transmitted periodically, for example with a rising edge. A falling edge, which in this case immediately follows one of the rising edges, codes the instantaneous counter state in the length of the temporal distance between the rising and the falling edge.

Advantageously, the clock-giving processor receives a second signal that confirms a successful synchronization of the clock-receiving processor with the counter. This confirms the synchronization.

Advantageously, the second signal and the first signal are sent using a time-division multiplexing method, via the same signal line. This saves a signal line and two general-purpose input-output pins.

Advantageously, the second signal and the first signal are sent on different signal lines. The parallel transmission accelerates the synchronization.

Advantageously, on the clock-giving processor a process is started after receipt of the second signal, and synchronous with the periodically repeating first edges. In this way, it is ensured that, after successful synchronization, the process starts simultaneously with the first signal at the clock-receiving processor.

Advantageously, a first signal is received by the clock-receiving processor, the first signal having, in an alternating manner, first edges having a first direction and second edges having a direction opposite the first edge, a state of a counter in the clock-receiving processor being determined as a function of a temporal distance between at least one of the first edges and at least one of the second edges. In this way, the clock-receiving processor works together with the above-mentioned clock-giving processors to achieve improved synchronization.

Advantageously, a first signal is received by the clock-receiving processor having periodically repeating first edges, the state of the counter in the clock-receiving processor being determined as a function of at least the one temporal distance between one of the first edges and a second edge immediately following the at least one first edge. The clock-receiving processor evaluates the above-mentioned edges in order to achieve improved synchronization.

Advantageously, the clock-receiving processor sends a second signal that confirms a successful synchronization of the counter of the clock-receiving processor. In this way, the clock-receiving processor signals its readiness to synchronously execute processes.

Advantageously, the second signal and the first signal are received via the same signal line, in a time-division multiplexing method. This saves a signal line and two general-purpose input-output pins.

Advantageously, the second signal and the first signal are received on different signal lines. The parallel transmission accelerates the synchronization.

Advantageously, on the clock-receiving processor a process is started after sending of the second signal and synchronous with the periodically repeating first edges. This ensures that the process on the clock-receiving processor is called synchronously with the clock-giving processor.

With regard to the device for the synchronization of processes, the clock-giving processor and the clock-receiving processor are configured to carry out the respective method.

The present invention also relates to a computer program having instructions for carrying out one of the mentioned methods, in particular on one of the mentioned processors.

Further advantageous embodiments result from the following description and the drawings.

DETAILED DESCRIPTION

Figure 1:
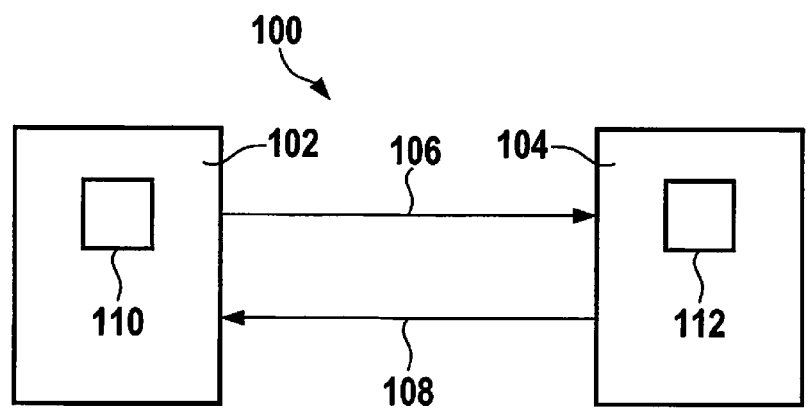
FIG. 1 schematically shows an interface between a clock-giving processor and a clock-receiving processor.

FIG. 1 schematically shows an interface 100 between a clock-giving processor 102 and a clock-receiving processor 104.

A device for the synchronization of processes includes either clock-giving processor 102 or clock-receiving processor 104 or both. More than two processors may also be provided. The device is situated in particular in a control device or in a plurality of control devices of a motor vehicle.

A computer program contains instructions for carrying out a method described below. The processors are configured to carry out the computer program.

Interface 100 is configured to transmit a first signal 106 from clock-giving processor 102 to clock-receiving processor 104. Interface 100 is configured to transmit a second signal 108 from clock-receiving processor 104 to clock-giving processor 102.

Clock-giving processor 102 includes a first counter 110. Clock-receiving processor 104 includes a second counter 112. Clock-giving processor 102 is configured to carry out a first process. Clock-receiving processor 104 is configured to carry out a second process. The processes are called for example every 20 ms, 40 ms, or 100 ms.

Figure 2:
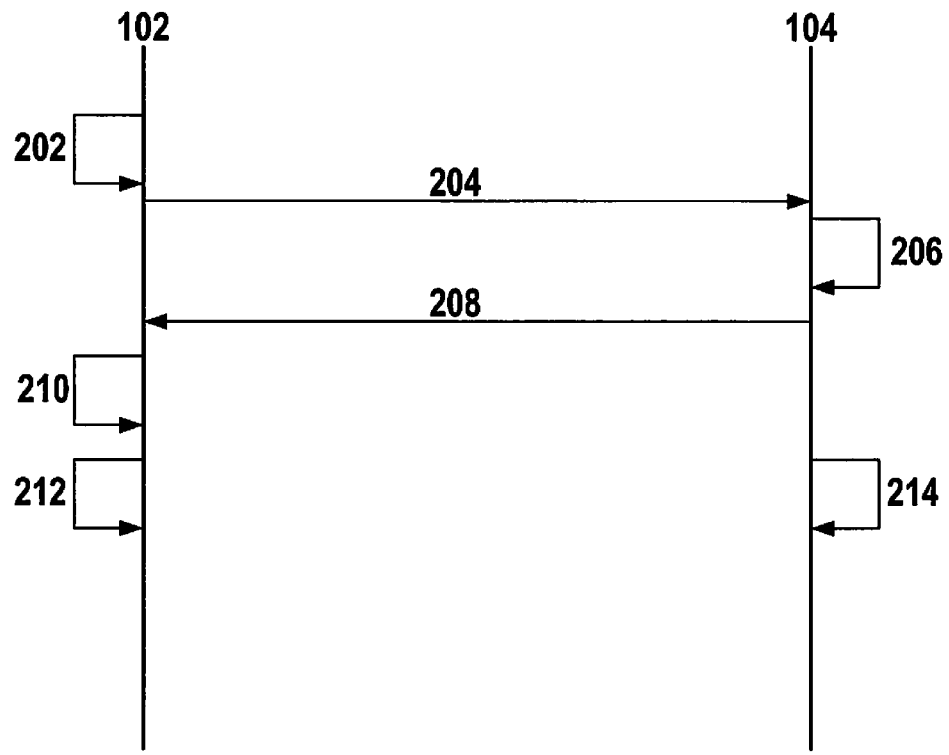
FIG. 2 schematically shows a signal flow diagram in a method for the synchronization of processes.

FIG. 2 schematically shows a signal flow diagram in a method for the synchronization of processes, in particular of the first process and the second process.

In a step 202, as a function of the state of the counter in clock-giving processor 102, a temporal distance is determined between at least one first edge and a second edge of first signal 106.

Subsequently, in a step 204, the first edge and the immediately following second edge are sent, with the temporal distance, from clock-giving processor 102 to clock-receiving processor 104.

Subsequently, in a step 206, clock-receiving processor 104 detects the first edge and the immediately following second edge, ascertains the temporal distance between the first edge and the second edge, and determines and corrects the state of second counter 112 in clock-receiving processor 104.

Subsequently, in an optional step 208, second signal 108 is sent from clock-receiving processor 104 to clock-giving processor 102, this signal confirming a successful synchronization of second counter 112 of clock-receiving processor 104. Optionally, the second process is marked as synchronous on clock-receiving processor 104.

Subsequently, in an optional step 210, second signal 108 is received by clock-giving processor 102. Optionally, the first process is marked as synchronous on clock-giving processor 102.

Subsequently, in a step 212 the first process is started at the time at which the first edges of the first signal occur.

In a step 214, the second process is started temporally synchronous therewith.

In the example, first signal 106 has, in an alternating manner, first edges having a first direction and second edges having a second direction opposite the first edge.

In the example, clock-giving processor 102 sends first signal 106, which may have repeating first and second edges. The first process and the second process are for example started synchronously with the periodically repeating first edges, but only after second signal 108 has been sent and received. The first edges can be rising edges. In this case, the second edges are falling edges. The first edges can also be falling edges. In this case, the second edges are rising edges.

The first signal may be sent by clock-giving processor 102 with periodically repeating first edges. Each of the periodically repeating first edges may be followed by a second edge at a distance that codes an instantaneous counter state of first counter 110 for clock-giving processor 102.

At least the temporal distance between one of the first edges and at least one second edge immediately following the at least one first edge is, as described above, determined as a function of the state of counter 110 in clock-giving processor 102, and is evaluated by clock-receiving processor 104 as described above.

Second signal 108 and first signal 106 can be transmitted in a time-division multiplexing method over the same signal line, or on different signal lines.

Figures 3, 4:
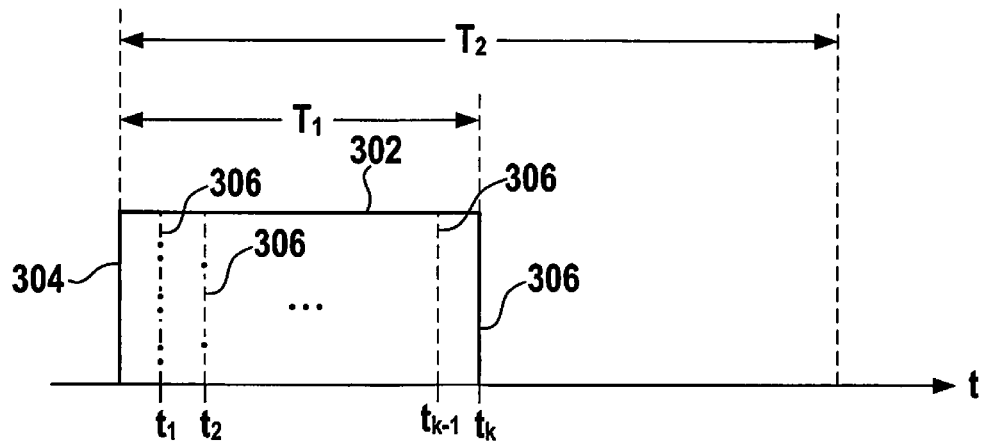
FIG. 3 schematically shows possible signal curves of a coded signal for the synchronization of the processes.
FIG. 4 schematically shows an assignment of a coding to the temporal spacing of edges having opposite direction in the coded signal.

FIG. 3 schematically shows possible signal curves of a coded signal 302 for the synchronization of the processes, which signal can be represented by the first edge and the second edge.

Starting from rising edge 304, the temporal distance is represented on the basis of various times t1, t2, ... tk−1, tk, at which there occurs a falling edge 306 of signal 302, immediately following rising edge 304. In this example, the largest temporal distance T1 is one-half of the period T2 with which rising edge 304 periodically repeats.

The instantaneous counter state can be coded as desired in temporal distance dT. The larger the number of different temporal distances that are available, the more precisely the instantaneous counter state can be represented.

FIG. 4 schematically shows an assignment of a coding to the temporal distance dT of edges having opposite directions in the coded signal, for different values of k.

The coding proceeds on the assumption that the counters are incremented from 0 to N−1 and then start again at 0. The various temporal distances dT to the falling edges 306 represent synchronization pulses sync by which first counter 110 communicates its state, and on the basis of which second counter 112 synchronizes its state. The synchronization pulses are numbered in FIG. 4. sync1 represents for example a falling edge at t1. One of the falling edges represents a special state of reaching the highest counter state N−1. In FIG. 4, this is designated by clock, instead of sync.

In the example, codings 11 and 10 are available for k=2. 11 means that the falling edge takes place at t2=T1. 10 means that the falling edge takes place at t1=T1/2.

For k=L, L−1 synchronization pulses are available, each synchronization pulse coding exactly one state of first counter 110. This coding is produced successively by measuring the temporal duration of a signal level at the general-purpose input-output pin of clock-receiving processor 104, at specified measurement times. A high signal level results in a coding 1, and a low signal level results in a coding 0. If a coding 0 has been acquired, the measurement can be terminated, because in the example only one falling edge is provided in a period T2.

The temporal distance dT of a synchronization pulse is dT=N*T2/(L−1).

A synchronization duration is therefore 2*N*T2/(L−1). In comparison, the conventional synchronization has a longer duration, 2*N*T2.

For T2=20 ms and N=10, for L=5 the improved synchronization yields a synchronization duration of 100 ms, compared to 400 ms in the mentioned existing art.

In the following, an implementation is shown for 20 ms process time:

Clock-Giving Processor
Init:
k, T1, N
Counter=−1
20 ms process:
Send rising edge 304 via general-purpose input-output pin;
Start timer;
Increment counter=counter+1;
If counter>=N, set counter=0:
Calculate temporal distance dT as a function of the value "counter";
Wait until the value "timer">=the value "temporal distance dT"; then send falling edge 306 via general-purpose input-output pin;
Clock-Receiving Processor
Init:
k, T1, N
Counter=−1
Measurement time=T1/k
20 ms process:
Interrupt by rising edge 304 starts 20 ms process;
Start timer;
Increment counter=counter+1
If counter>=N counter=0;
Wait until value "timer">="counter"*"measurement time", then measure signal level at general-purpose input-output pin;
If signal level 1, then store instantaneous values, repeat previous steps starting from the incrementing of the counter;
If signal level 0, then terminate the measurement and synchronization of the counter;
Send the second signal.

The synchronization of the counter take place for example by setting second counter 112 to the coded value if the instantaneous value of second counter 112 differs from the coded value.

What is claimed is:

1. A method for synchronizing processes, the method comprising:

sending, via a clock-giving processor, a first signal to a clock-receiving processor, the first signal having, in an alternating manner, first edges having a first direction and second edges having a second direction opposite the first edge, wherein a temporal distance, between one of the first edges in the first signal and one of the second edges which immediately follows the one of the first edges in the first signal, is determined by the clock-giving processor as a function of a state of a counter in the clock-giving processor; and receiving, by the clock-giving processor, a second signal sent from the clock-receiving processor in response to the first signal, the second signal confirming a successful synchronization of the clock-receiving processor with the counter of the clock-giving processor.

2. The method of claim 1, wherein the first signal is sent by the clock-giving processor with periodically repeating first edges.

3. The method of claim 2, wherein on the clock-giving processor, a process is started after the receipt of the second signal and synchronous with the periodically repeating first edges.

4. The method of claim 1, wherein the second signal and the first signal are sent via the same signal line, in a time-division multiplexing method.

5. The method of claim 1, wherein the second signal and the first signal are sent on different signal lines.

6. The method as recited in claim 1, wherein the temporal distance determined by the clock-giving processor encodes a value of the counter in the clock-giving processor.

7. The method as recited in claim 1, wherein the counter in the clock-giving processor is configured to increment from 0 to N−1 and then to start again at 0, wherein N−1 is a highest counter state of the counter in the clock-giving parameter.

8. A method for synchronizing processes, the method comprising:

receiving, via a clock-receiving processor from a clock-sending processor, a first signal, the first signal having, in an alternating manner, first edges having a first direction and second edges having a second direction opposite the first edge; and determining a state of a counter in the clock-receiving processor as a function of a temporal distance between one of the first edges in the first signal and one of the second edges which immediately follows the one of the first edges in the first signal;

wherein the temporal distance encodes a value of a counter in the clock-sending processor; and wherein the method further comprises:

setting a value of the counter in the clock-receiving processor to the encoded value of the counter in the clock-sending processor to synchronize the counter in the clock-receiving processor with the counter in the clock-sending processor.

9. The method of claim 8, wherein the first signal is received by the clock-receiving processor with periodically repeating first edges.

10. The method of claim 9, wherein the clock-receiving processor sends a second signal that confirms a successful synchronization of the counter of the clock-receiving processor.

11. The method of claim 10, wherein the second signal and the first signal are received via the same signal line, in a time-division multiplexing method.

12. The method of claim 10, wherein the second signal and the first signal are received on different signal lines.

13. The method of claim 10, wherein on the clock-receiving processor, a process is started, after the sending of the second signal, and synchronous with the periodically repeating first edges.

14. A device for synchronizing processes, comprising:
a clock-giving processor configured to:
send, via the clock-giving processor, a first signal to a clock-receiving processor, the first signal having, in an alternating manner, first edges having a first direction and second edges having a second direction opposite the first edge, wherein a temporal distance, between one of the first edges in the first signal and one of the second edges which immediately follows the one of the first edges in the first signal, is determined by the clock-giving processor as a function of a state of a counter in the clock-giving processor; and
receive, by the clock-giving processor, a second signal sent from the clock-receiving processor in response to the first signal, the second signal confirming a successful synchronization of the clock-receiving processor with the counter of the clock-giving processor.

15. The device as recited in claim 14, wherein the temporal distance determined by the clock-giving processor encodes a value of the counter in the clock-giving processor.

16. The device as recited in claim 14, wherein the counter in the clock-giving processor is configured to increment from 0 to N−1 and then to start again at 0, wherein N−1 is a highest counter state of the counter in the clock-giving parameter.

17. A device for synchronizing processes, comprising:
a clock-receiving processor configured to:
receive, via the clock-receiving processor from a clock-sending processor, a first signal, the first signal having, in an alternating manner, first edges having a first direction and second edges having a second direction opposite the first edge; and
determine a state of a counter in the clock-receiving processor as a function of a temporal distance between one of the first edges in the first signal and one of the second edges which immediately follows the one of the first edges in the first signal;
wherein the temporal distance encodes a value of a counter in the clock-sending processor; and wherein the clock-receiving processor is further configured to:
set a value of the counter in the clock-receiving processor to the encoded value of the counter in the clock-sending processor to synchronize the counter in the clock-receiving processor with the counter in the clock-sending processor.

18. A non-transitory computer readable medium on which is stored a computer program including program code for synchronizing processes, the program code, when executed by a processor, causing the processor to perform the following:
sending, via a clock-giving processor, a first signal to a clock-receiving processor, the first signal having, in an alternating manner, first edges having a first direction and second edges having a second direction opposite the first edge, wherein a temporal distance, between one of the first edges in the first signal and one of the second edges which immediately follows the one of the first edges in the first signal, is determined by the clock-giving processor as a function of a state of a counter in the clock-giving processor; and
receiving, by the clock-giving processor, a second signal sent from the clock-receiving processor in response to the first signal, the second signal confirming a successful synchronization of the clock-receiving processor with the counter of the clock-giving processor.

* * * * *